United States Patent
Bauman et al.

[11] Patent Number: 5,832,304
[45] Date of Patent: Nov. 3, 1998

[54] MEMORY QUEUE WITH ADJUSTABLE PRIORITY AND CONFLICT DETECTION

[75] Inventors: Mitchell A. Bauman, Circle Pines; Jerome G. Carlin, Shoreview; Roger L. Gilbertson, Minneapolis, all of Minn.

[73] Assignee: Unisys Corporation, Blue Bell, Pa.

[21] Appl. No.: 404,791

[22] Filed: Mar. 15, 1995

[51] Int. Cl.$^6$ .................................................. G06F 13/18
[52] U.S. Cl. ........................ 395/860; 395/859; 711/151; 711/158
[58] Field of Search ...................... 395/478, 485, 395/444, 449, 872, 250, 474, 475, 477, 297, 728, 729, 732, 857; 370/60, 61, 92, 93, 94.1, 95.3, 112, 113; 711/151, 158

[56] References Cited

U.S. PATENT DOCUMENTS

| | | | |
|---|---|---|---|
| 4,400,771 | 8/1983 | Suzuki et al. | 395/478 |
| 4,598,362 | 7/1986 | Kinjo et al. | 395/250 |
| 4,707,781 | 11/1987 | Sullivan et al. | 395/474 |
| 4,736,362 | 4/1988 | Clark et al. | 370/58 |
| 5,088,053 | 2/1992 | Sprague et al. | 345/521 |
| 5,140,682 | 8/1992 | Okura et al. | 395/457 |
| 5,165,021 | 11/1992 | Wu et al. | 395/250 |
| 5,193,193 | 3/1993 | Iyer | 395/297 |
| 5,214,769 | 5/1993 | Uchida et al. | 395/478 |
| 5,218,688 | 6/1993 | Nishida | 395/478 |
| 5,235,688 | 8/1993 | Taniguchi et al. | 395/445 |
| 5,241,632 | 8/1993 | O'Connell et al. | 395/297 |
| 5,282,271 | 1/1994 | Hsieh et al. | 395/297 |
| 5,317,720 | 5/1994 | Stamm et al. | 711/143 |
| 5,432,923 | 7/1995 | Taniguchi et al. | 395/402 |
| 5,530,835 | 6/1996 | Vashi et al. | 395/474 |

*Primary Examiner*—Eddie P. Chan
*Assistant Examiner*—Hiep T. Nguyen
*Attorney, Agent, or Firm*—Charles A. Johnson; Mark T. Starr

[57] ABSTRACT

An improved memory request storage and allocation system using parallel queues to retain different categories of memory requests until they can be acted on by the main memory. Memory requests in the parallel queues are allowed to access the main memory according to a queue priority scheme. The queue priority scheme is based on an adjustable ratio, which determines the rate at which memory requests from one queue are allowed to access the main memory versus memory requests from other queues. Registers for bypassing the adjustable ratio eliminate delays by prohibiting the queue priority circuitry from attempting to retrieve a non-existent memory request from a queue. Conflict detection circuitry maintains proper instruction order in the parallel queue architecture by ensuring that subsequent memory requests, which have the same address as a memory request already in the queue, are placed in the same queue in the order that they were entered into the queue.

25 Claims, 9 Drawing Sheets

| I/O MEMORY REQUEST INDICATOR | REMOTE INTERFACE INDICATOR | IP QUEUE CONFLICT | I/O QUEUE CONFLICT | MEMORY QUEUE SELECTED |
|---|---|---|---|---|
| 0 | 0 | 0 | 0 | IP QUEUE |
| 0 | 0 | 0 | 1 | I/O QUEUE |
| 0 | 0 | 1 | 0 | IP QUEUE |
| 0 | 0 | 1 | 1 | NA |
| 0 | 1 | 0 | 0 | I/O QUEUE |
| 0 | 1 | 0 | 1 | I/O QUEUE |
| 0 | 1 | 1 | 0 | IP QUEUE |
| 0 | 1 | 1 | 1 | NA |
| 1 | 0 | 0 | 0 | I/O QUEUE |
| 1 | 0 | 0 | 1 | I/O QUEUE |
| 1 | 0 | 1 | 0 | IP QUEUE |
| 1 | 0 | 1 | 1 | NA |
| 1 | 1 | 0 | 0 | NA |
| 1 | 1 | 0 | 1 | NA |
| 1 | 1 | 1 | 0 | NA |
| 1 | 1 | 1 | 1 | NA |

MEMORY QUEUE WITH ADJUSTABLE PRIORITY AND CONFLICT DETECTION

BACKGROUND OF THE INVENTION

1. Field of the Invention

This invention relates to memory access queues, and more particularly to providing adjustable-ratio priorities to parallel memory access queues, and to detecting, maintaining and managing the order of memory references in the queues.

2. Description of the Prior Art

Data processing systems typically perform central processing and input/output (hereinafter "I/O") functions. The central processing units in a data processing system are often referred to as "instruction processors". The instruction processors carry out data manipulations and control functions at the heart of the data processing system. The instruction processors are heavily dependent upon the main storage (i.e., memory) within the data processing system, since they require data on which to operate, and resulting calculations must be stored for future use. I/O functions are also very reliant on the main storage of the system, since data is transferred between peripheral devices and the main memory to allow the instruction processors to control the peripheral devices coupled to it.

A problem with many data processing systems is that the rate at which the instruction processors can process data is faster than the rate at which I/O devices can access and transfer data. Although memory caching can help increase I/O rates, the main storage must still be accessed on cache "misses". Both the instruction processors and the I/O devices in the system must therefore access the main storage. Where instruction processor memory requests, I/O memory requests, or any other memory requests are competing for main storage access, it is very likely that the requests will accumulate faster than the main storage can manage the requests. In such cases, memory queues are implemented to temporarily store the various memory requests until the main storage can individually act on the memory requests. These "memory requests" are simply addresses to data stored in a memory device. It is known in the art to utilize a single first-in-first-out (FIFO) queue to store these memory requests, such as the FIFO shown in FIG. 3. However, storing the I/O memory requests in a single FIFO along with instruction processor memory requests can decrease the I/O rate. This is because prior instruction processor memory requests in the FIFO queue are handled before later I/O memory requests. This additional delay for I/O activity produces the undesirable result of lowering I/O rates. Furthermore, the I/O in the system often includes devices which have a maximum allowable memory access time, and if this access time is exceeded, errors can occur, such as device overrun errors.

The present invention overcomes this problem by utilizing parallel memory queues, and by recognizing memory requests from these queues based on an adjustable priority scheme. A different queue can be assigned to a particular type of memory request. For example, one queue can be assigned to store I/O memory requests, and another queue can be appointed as the IP memory request queue. A system having approximately equal IP to I/O memory requests could have a priority ratio of 50%, meaning that one I/O memory request will be handled for every one IP memory request. In a system which has heavy input/output activity, the queue assigned to I/O memory requests could be given a higher priority, such as 67%. In such a case, two I/O memory requests would be handled for every one IP memory request. In this way, the data processing system can be efficiently "tuned" to the most desirable ratio. This design proves to be extremely effective where critical errors would occur if the I/O memory requests were not acknowledged fast enough to avoid device overruns. In this case, faster input/output rates can be achieved even under heavily loaded IP conditions.

Some types of priority schemes for memory queues exist in prior art, wherein preselected memory requests are given a "fixed" priority over other memory requests. One such arrangement is shown in U.S. Pat. No. 5,088,053 by Sprague et al., issued on Feb. 11, 1992. Sprague et al. appears to disclose the use of two input FIFOs for normal memory requests and urgent memory requests. However, this design apparently uses a "fixed priority scheme", unlike the present invention's priority which is determined by preemptive ratios. Another such arrangement is disclosed in U.S. Pat. No. 5,165,021 by Wu et al., issued on Nov. 17, 1992. This reference appears to describe the use of a fixed priority scheme wherein requests are given a priority, and if the queue receives too many requests, requests of the lowest priority are "discarded" (col. 6, lines 60–63). The present invention separates the high and low priority requests into separate parallel queues. The advantage of the present invention is that the parallel queues are permitted access to the main memory by an adjustable priority scheme. This allows the priority to change depending on the particular characteristics of the system, which increases efficiency by balancing the amount of idle time that the memory requests in the parallel queues must endure.

The use of parallel memory queues creates a concern in maintaining proper order of memory references. Prior memory requests having the same address as the incoming memory request must access the main storage before the incoming memory request does. This is because the earlier memory request will affect the data at the main storage address, and the subsequent memory request must wait until that occurs. In a single FIFO queue, this poses no problem because all memory requests will be acknowledged in the order that they were put on the queue. However, where parallel queues are used, it is possible that a subsequent memory request from a higher priority queue could be allowed to access the main storage before an earlier memory request having the same address from the other queue. This could result in incorrect data being read from the main storage, or valid data in the main storage being overwritten.

In order to avoid such a problem, the present invention employs a conflict detection scheme. Each memory request from the parallel memory queues are compared to the incoming memory request. If the conflict detection circuitry determines that an incoming memory request has the same address as a prior memory request already queued, the incoming memory request is routed to the memory queue that is storing that prior memory request. By putting the subsequent memory request in the same FIFO queue as the prior memory request, the prior memory request will be allowed to access the main storage before the subsequent memory request.

The present invention provides a memory queuing architecture that allows separation of predetermined types of memory requests. The order of memory references is maintained through the use of conflict detection circuitry. Main storage access by queued memory requests takes place pursuant to an adjustable priority ratio, where the ratio defines how often one memory queue is enabled relative to the other queue(s) in the parallel queue structure. Memory request rates for particular memory requests can be increased by simply adjusting the priority ratio. This provides flexibility and greater efficiency in handling memory requests of different types, such as instruction processor and input/output memory requests.

OBJECTS

It is a primary objective of this invention to provide an improved address queuing and allocation apparatus.

It is another object of the present invention to provide an address queuing scheme which increases the speed in which predetermined categories of memory requests can be recognized.

Yet another object of the invention is to store different categories of memory requests in parallel queues, and to allow preemptive priority for predetermined categories of memory requests.

It is still another object of the present invention to provide for memory request retrievals from the parallel queues according to a predetermined ratio.

It is another object of the invention to allow the ratio of memory request retrievals to be changed to best suit the memory request rates of the system.

It is yet another object of the present invention to use a counter and a predetermined count value to generate the ratio of memory request retrievals, by retrieving a memory request from a different parallel queue when the counter reaches the predetermined count value.

It is a further object of the invention to provide memory request bypass capabilities to override the current memory request retrieval ratio through continuous selection of one of the parallel queues.

Still another object of the invention is to provide address conflict detection to allow queue loading without disrupting proper instruction order.

It is still another object of the present invention to store equivalent memory requests in the same one of the parallel queues upon detection of an address conflict, so that proper order of memory references can be maintained.

Other more detailed objectives will become apparent from a consideration of the Drawings and the Detailed Description of the Preferred Embodiment.

SUMMARY OF THE INVENTION

The Memory Queue With Adjustable Priority and Conflict Detection provides flexibility, efficiency, and increased relative speeds of system memory request recognition. The system in which the invention resides is a data processing system having a main memory and multiple memory requesting devices, including instruction processor and input/output memory requesters. Because memory requests may be occurring faster than the main memory can act on them, queuing must be used to store the memory requests until the main memory is ready to accept them. The present invention utilizes parallel queues for retaining memory requests until they can be processed by the main memory.

The memory requests are selected one at a time to be directed to one of the parallel queues. The memory requests are transmitted to one of the parallel queues according to the type of memory request it is. For instance, instruction processor memory requests can be transmitted to one of the queues, and input/output memory requests can be transmitted to another one of the parallel queues. This parallel queuing structure allows the queue priority circuitry to select memory requests from any of the parallel queues. The queue priority circuitry generates control signals which control a selection circuit, such as a multiplexer, which in turn will select a memory request from one of the parallel queues.

The queue priority circuitry includes a ratio selector, that can be set so that memory requests are retrieved from the parallel queues according to a predetermined queue ratio. For instance, the queue ratio could be set so as to retrieve one memory request from a first queue, three memory requests from a second queue, and so forth. The ratio selector of the present invention can be modified during periods of inactivity, or during normal operation, so that the ratio of memory requests could be changed at any time. This provides the ability to efficiently set the ratio according to the unique characteristics of the data processing system.

The ratio selector of the present invention uses a loadable count value, and a counter to generate the desired ratio. The counter continually increments until a comparator indicates that the counter is equal to one of the count values, at which time a control signal is generated to direct the selection circuit to choose the corresponding queue as the one to provide a memory request to the main memory.

The queue priority circuit also includes other loadable registers to determine which queue should be selected as the one to provide a memory request to the main memory. A priority select register is provided to invert the ratio in systems having two parallel queues. Therefore, if the original ratio was three-to-one, an active signal in the priority select register would invert the ratio to one-to-three, thus swapping the priorities of the queues. Also included in the queue priority circuitry are output-valid registers, which indicate whether there are any memory requests in their associated queues. If there are no memory requests in a particular one of the parallel queues, its associated output-valid register will cause the ratio in the queue priority to be temporarily changed to disregard requests to that queue. This in effect is a bypass mode, which saves valuable time by prohibiting the queue priority circuitry from attempting to retrieve a non existent memory request from a queue.

The present invention also includes conflict detection circuitry. This circuitry maintains proper memory request order in the parallel-queue system as seen by the storage controller. For instance, an instruction processor may issue a memory write request to the storage controller, which is placed on the memory request queue behind other requests to memory. A subsequent memory read request from a remote interface to the same address as the memory write request can not be allowed to access the main memory before the prior memory write request has a chance to write to that address. For such cases, the conflict detection circuitry ensures that the subsequent memory read request is placed in the same queue as the prior memory write request having the same address. The conflict detection circuitry performs this function by comparing each of the memory requests in the parallel queues to the incoming memory request. If a match is found, the incoming memory request is put in the same queue in which the equivalent memory request was located, and the memory requests will be received by the main memory in the proper order.

Still other objects and advantages of the present invention will become readily apparent to those skilled in this art from the following detailed description, where the preferred embodiment of the invention is shown by way of illustration of the best mode contemplated of carrying out the invention. As will be realized, the invention is capable of other and different embodiments, and its details are capable of modification without departing from the invention. Accordingly, the drawing and description are to be regarded as illustrative in nature, and not as restrictive.

DETAILED DESCRIPTION OF THE PREFERRED EMBODIMENT

Figure 1:
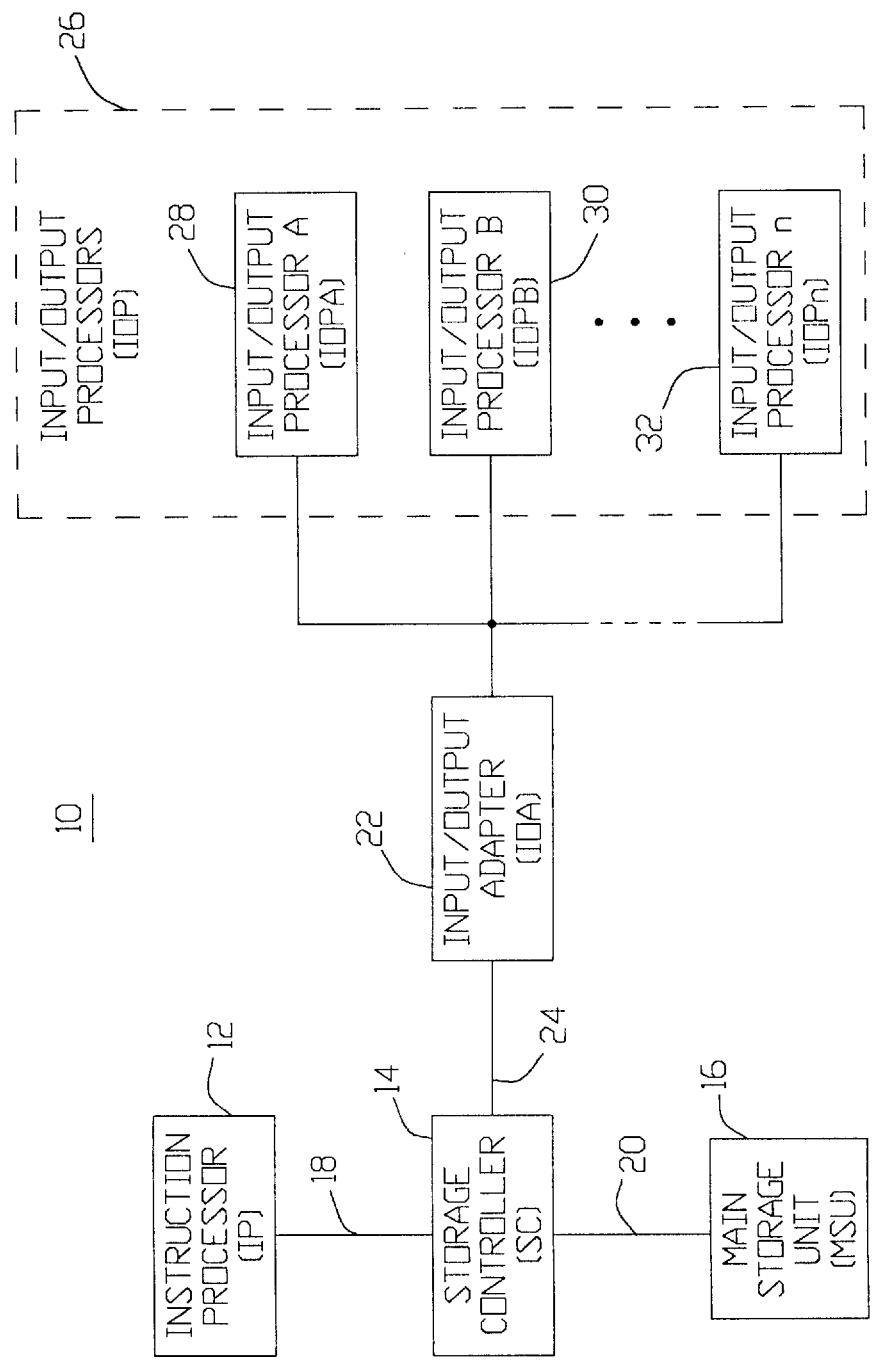
FIG. 1 is a fundamental block diagram of the Data Processing System according to the present invention.

FIG. 1 is a fundamental block diagram of the Data Processing System 10 according to the present invention. Data Processing System 10 includes an Instruction Processor 12 (hereinafter IP), a Storage Controller 14 (hereinafter SC), and a Main Storage Unit 16 (hereinafter MSU). The IP 12 is the central processing unit for the execution of program and system software instructions. The IP 12 is coupled to the SC 14 via Interface 18, which provides storage request priority and data routing between the major components of the system. The MSU 16, which provides the main storage capability for the Data Processing System 10, is connected to the SC 14 via Interface 20.

The Data Processing System 10 of FIG. 1 also includes input/output capabilities. The SC 14 is connected to the Input/Output Adapter 22 (hereinafter IOA) by Interface 24. The IOA 22 provides the SC 14 with storage requests from the Input/Output Processors 26 (hereinafter IOP). The IOP 26 comprises multiple individual IOPs, shown in FIG. 1 as IOPA 28, IOPB 30, through IOPn 32. The IOA 22 provides the interface from the IOP 26 to the SC 14.

Figure 2:
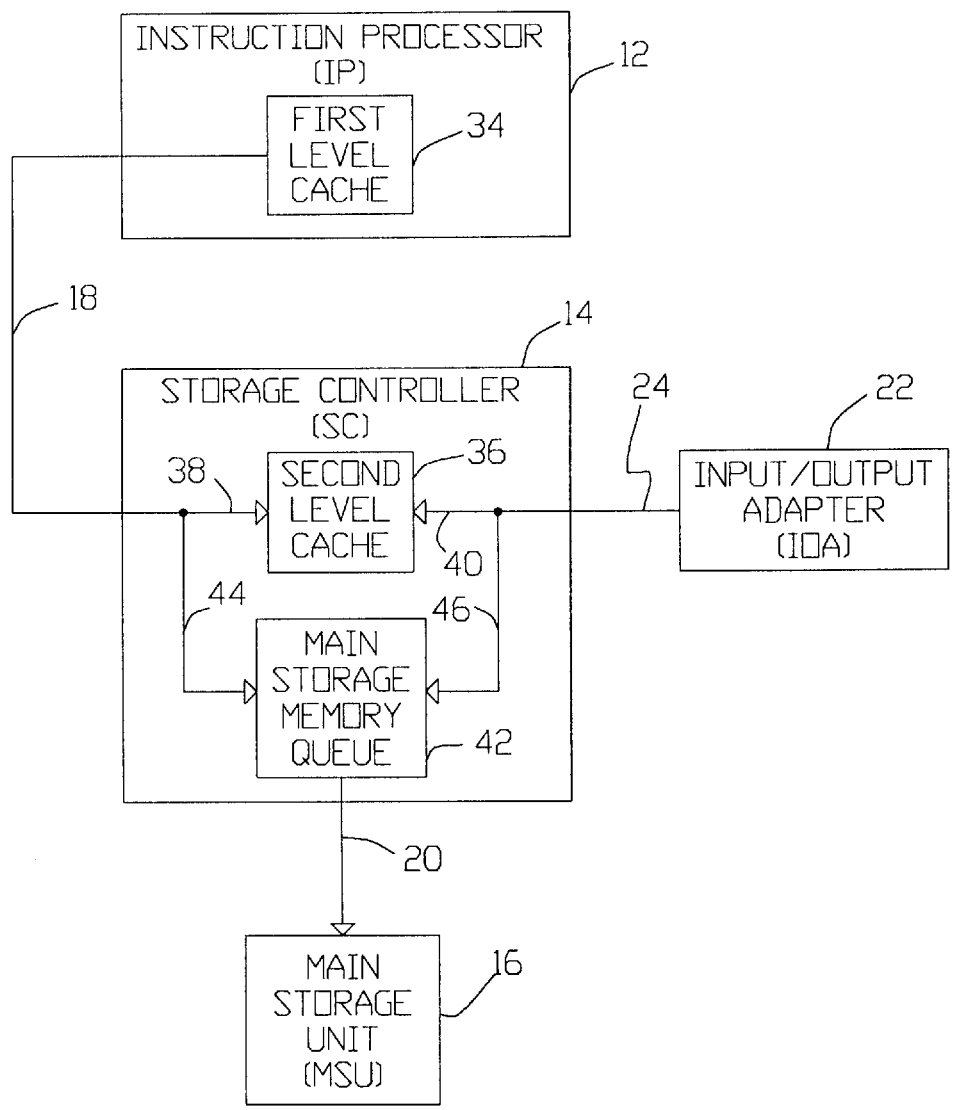
FIG. 2 is a diagram of the memory hierarchy within the Data Processing System.

FIG. 2 is a diagram of the memory hierarchy within the Data Processing System 10. The IP 12 contains a First Level Cache 34, which represents the first level of the memory hierarchy. Some cache accesses associated with normal instruction execution will take place in the First Level Cache 34. The IP 12 requests access of a particular data element which may or may not be within the First Level Cache 34. If the data element is present and valid, the access is completed at that level. If not, access is made to the SC 14 via Interface 18 to access the desired data element.

The second level of the memory hierarchy is within the SC 14, and is shown as the Second Level Cache 36. Any memory request to SC 14 is routed to the directory of the Second Level Cache 36 to determine if the desired data element is present and valid. A "memory request" is an address to a particular data bit, byte, word, longword, etc. stored in the MSU 16. Memory requests are made to the Second Level Cache 36 from the IP 12 via Interface 38, and from the IOA 22 via Interface 40. If the data element is present and valid, the memory access is completed at that level, and the MSU 16 will not be accessed. If the data element is not present and valid within the Second Level Cache 36, the data must be requested from the MSU 16.

The MSU 16 represents the third level of the memory hierarchy of the Data Processing System 10. Where cache "misses" occur in the Second Level Cache 36, the data element must be retrieved from the MSU 16. The Second Level Cache 36 can handle data requests much faster than the MSU 16. Since the Second Level Cache 36 is faster than the MSU 16, it must be "buffered" from the slower MSU to allow the Second Level Cache to operate during an MSU fetch. The advantage of using a fast cache (the Second Level Cache 36) would be thwarted if it had to suspend operation to wait for the MSU 16 to complete a memory access cycle. To allow the Second Level Cache 36 to operate independently of the MSU 16, the Main Storage Memory Queue 42 is provided to buffer the Second Level Cache 36 from the MSU 16. Memory requests from the IP 12 are made to the Main Storage Memory Queue 42 via Interface 44, and memory requests from the IOA 22 are made to the Main Storage Memory Queue 42 via Interface 46. The Main Storage Memory Queue 42 is connected to the MSU 16 via Interface 20. Therefore, when there is a Second Level Cache 36 "miss", the data request is stored in the Main Storage Memory Queue 42 to await handling by the MSU 16.

Figure 3:
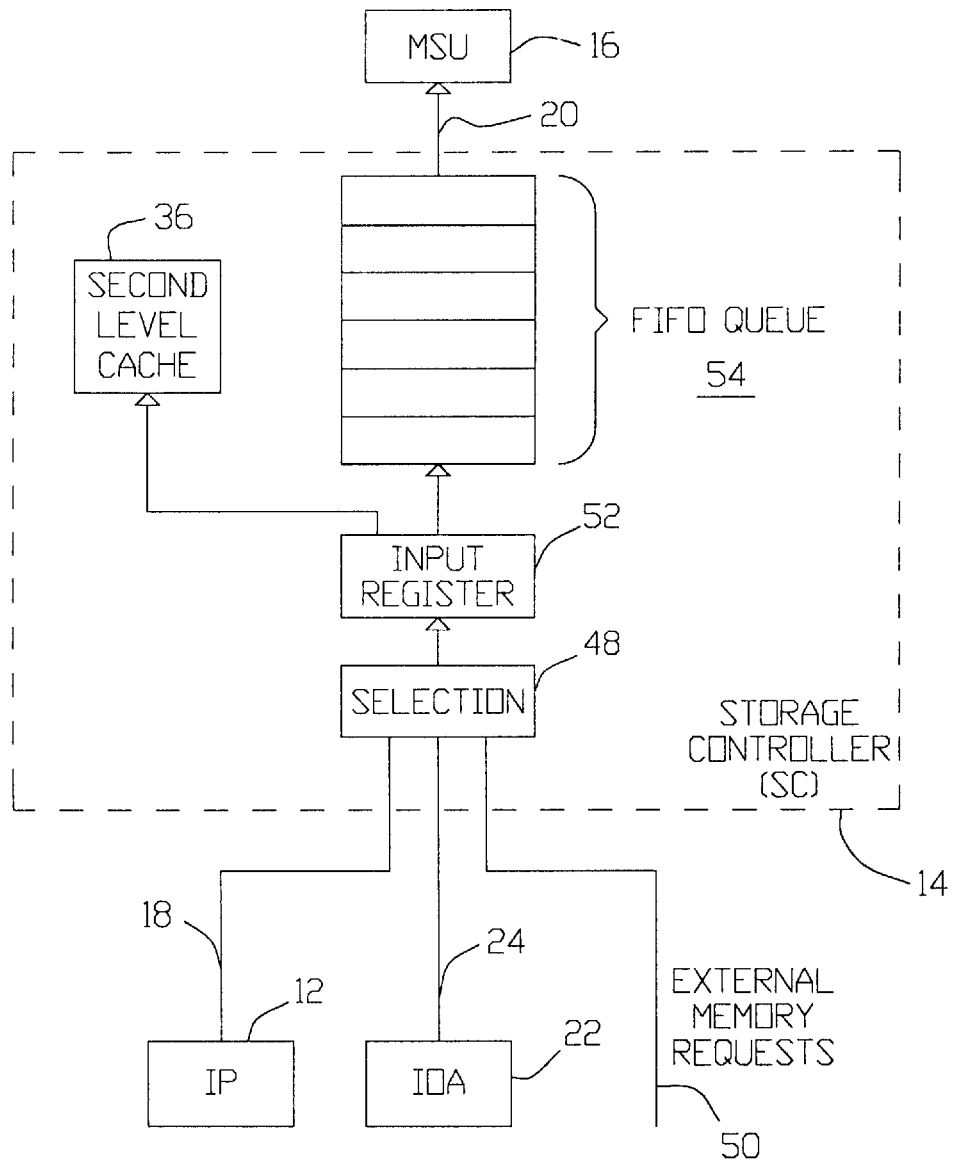
FIG. 3 is a block diagram of a known method of queuing memory requests.

FIG. 3 is a block diagram of a known method of queuing memory requests. Within the SC 14 is a Selection Circuit 48 which receives memory requests from the IP 12, the IOA 22, and other External Memory Requests 50. The selection method used for the Selection Circuit 48 is not important, and any type of selection method could be used. In the preferred embodiment, a multiplexer was used. The External Memory Requests are individually routed to the Input Register 52 where they are latched. As previously described, an attempt to locate the requested data element from the Second Level Cache 36 will take place. If the data element is not within the Second Level Cache 36, the memory request is queued in the FIFO Queue 54. The FIFO Queue 54 represents a strict "first-in, first-out" queue which is well-known in the art. The memory requests entered into the queue are used to access the MSU 16 in the order that they were input into the FIFO Queue.

A memory queuing architecture as in FIG. 3 will direct memory requests to the MSU 16 in the order that they are received by the FIFO Queue 54. For example, if five consecutive memory requests were made from the IP 12, and then one memory request was made from the IOA 22, all five IP memory requests would be allowed to access the MSU 16 before the IOA memory request was recognized. This limitation can have adverse effects in a data processing system. This results from the fact that the input/output in the system may require a certain maximum allowable access time. If this maximum access time is exceeded, errors such as device overruns can occur. Some device overruns may cause system operation to be terminated. The IPs do not have a maximum allowable access time, and they simply suspend operation rather than terminate system operation. Therefore, where both IP and I/O memory requests are occurring, the I/O memory requests should be allowed to preempt the IP memory requests to some extent.

Figure 4:
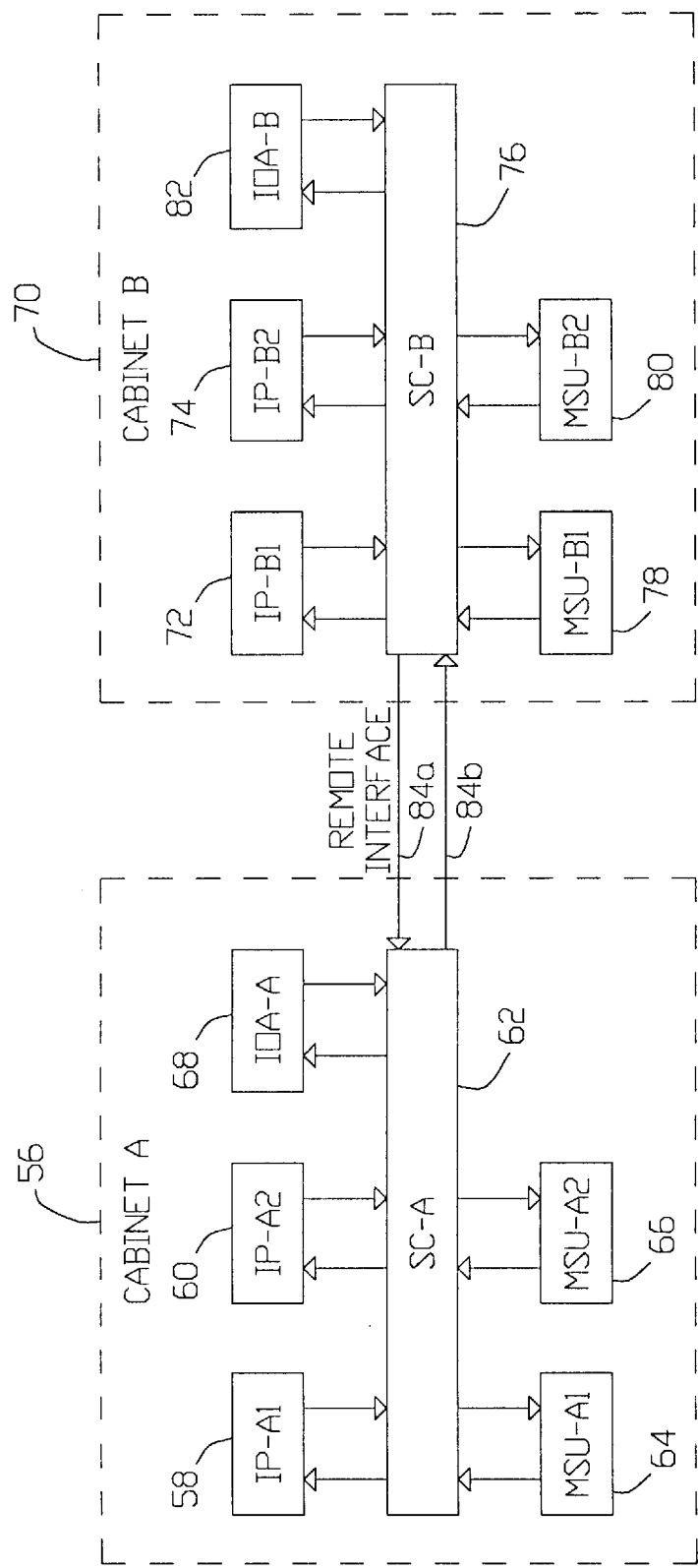
FIG. 4 is a block diagram of the particular data processing system encompassing the present invention.

FIG. 4 is a block diagram of the particular data processing system encompassing the present invention. The large multi-processing system in which the present invention resides is capable of expansion as shown in FIG. 4. The fundamental Data Processing System 10 of FIG. 1 can be duplicated to provide for parallel instruction processing, additional input/output capabilities, and increased memory capacity.

FIG. 4 shows one embodiment of this expansion, wherein two of the Data Processing Systems 10 of FIG. 1 are housed in two separate cabinets. Cabinet A 56 includes two instruction processors labeled IP-A1 58 and IP-A2 60, a storage controller labeled SC-A 62, two main storage units labeled MSU-A1 64 AND MSU-A2 66, and an input/output adapter labeled IOA-A 68. Similarly, Cabinet B 70 includes two instruction processors labeled IP-B1 72 and IP-B2 74, a storage controller labeled SC-B 76, two main storage units labeled MSU-B1 78 AND MSU-B2 80, and an input/output adapter labeled IOA-B 82. The instruction processors IP-A1 58 and IP-A2 60, and the input/output adapter IOA-A 68 of Cabinet A 56 request data elements from the Second Level Cache of SC-A 62, and from MSU-A1 64 and MSU-A2 66 as was described in FIG. 2. In the same manner, the instruction processors IP-B1 72 and IP-B2 74, and the input/output adapter IOA-B 82 of Cabinet B 70 request data elements from the Second Level Cache of SC-B 76, and from MSU-B1 78 and MSU-B2 80.

The Second Level Cache 36 described in FIG. 2 is a "shared" cache for all instruction processors and input/output processors in the entire data processing system. In other words, the Second Level Cache 36 in SC-A 62 will hold the same data as the Second Level Cache 36 in SC-B 76. Furthermore, the IPs and IOAs of one cabinet can access memory from the MSUs of the other cabinet. This is performed by way of the REMOTE INTERFACE on Interfaces 84a and 84b. It should be noted that continued expansion of cabinets could occur, and in the system accompanying the present invention up to four cabinets may be present. Each storage controller (SC-A 62, SC-B 76, etc.) would be coupled to each of the other storage controllers in this situation.

Figure 5:
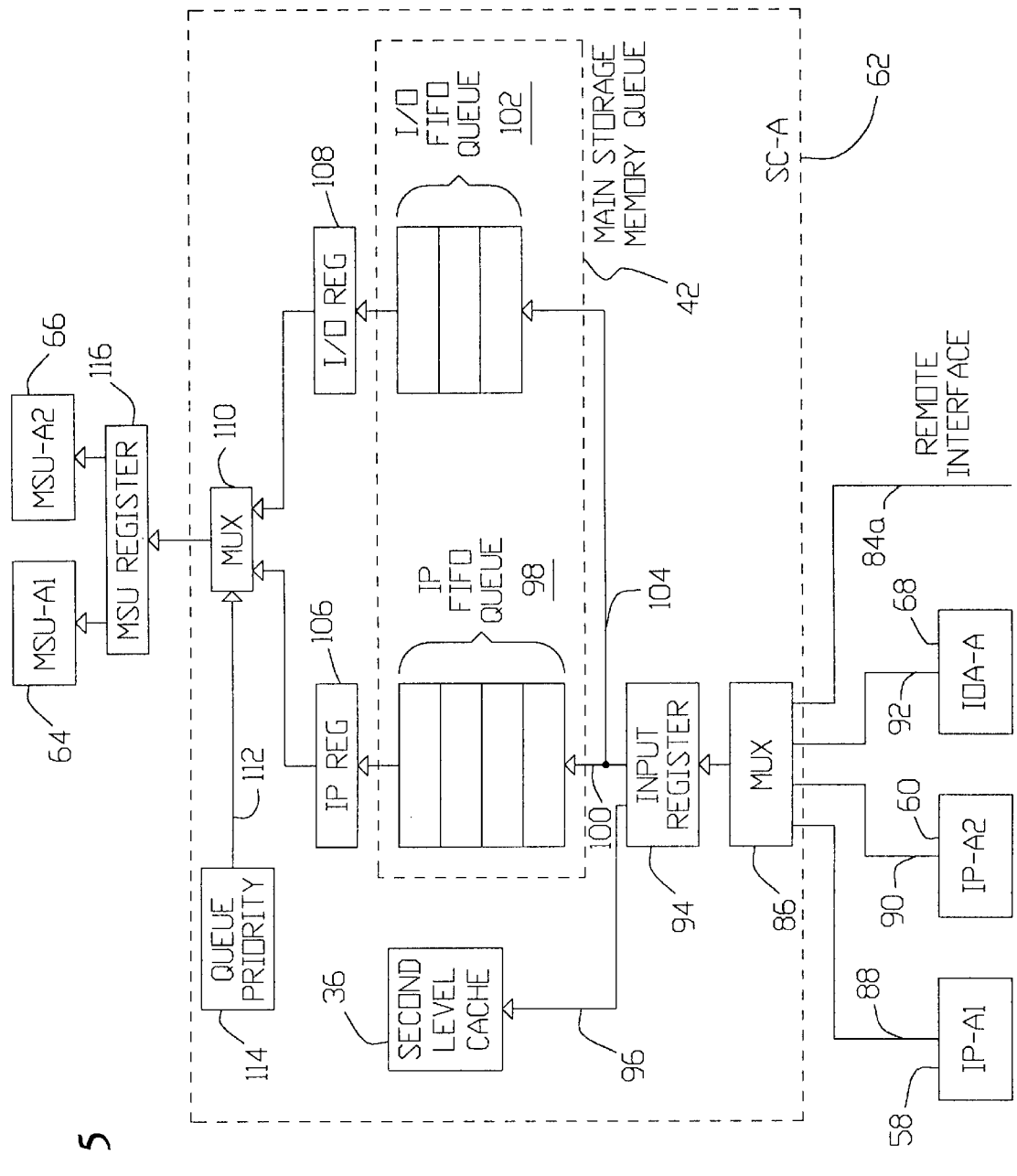
FIG. 5 is a block diagram that shows how instruction processor and input/output memory requests in the system of FIG. 4 are separated to prevent storage access domination by the instruction processors.

FIG. 5 is a block diagram that shows how instruction processor and input/output memory requests in the system of FIG. 4 are separated to prevent storage access domination by the instruction processors. The Main Storage Memory Queue 42 (see also FIG. 2) is comprised of parallel FIFO queues in both SC-A 62 and SC-B 76. SC-A 62 will be used for the discussion of FIG. 5, but it should be understood that this discussion applies equally to SC-B 76 with regards to the utilization of parallel memory request queues.

The Instruction Processors, labeled IP-A1 58 and IP-A2 60, which are associated with SC-A 62, are inputs to the multiplexer labeled MUX 86 via Interfaces 88 and 90 respectively. Input/Output Adapter IOA-A 68 is also coupled to the MUX 86, by way of Interface 92. Finally, memory requests from other instruction processors and input/output processors are input to the MUX 86 via the REMOTE INTERFACE on Line 84a. The MUX 86 selects one of the inputs to be passed to the Input Register 94. Selection by the MUX 86 is accomplished through control signals (not shown) which indicate which of the MUX 86 inputs is to be selected. The binary control signals can simply count from binary 0 to its maximum binary value to individually sequence through each memory request input (i.e., binary 00, 01, 10, and 11 to sequence through four memory request inputs). Other criteria could be used to select memory request inputs upon recognition of the presence of a memory request. The exact criteria used to control the MUX 86 is not relevant to the present invention; it is only important that a selection method be used to pass one memory request at a time to the Input Register 94.

The Input Register 94 latches the selected memory request from the MUX 86. At this time, the memory request is sent to the Second Level Cache 36 across Interface 96 to see if the desired data is present within the Second Level Cache. If so, the data is retrieved from the Second Level Cache 36, and the memory request will not be loaded into the Main Storage Memory Queue 42. If the desired data is not present in the Second Level Cache 36, the memory request will be loaded into one of the two queues within the Main Storage Memory Queue 42. As a general rule, memory requests from IP-A1 58 and IP-A2 60 will be loaded into the IP FIFO Queue 98 via Interface 100, and memory requests from IOA-A 68 will be loaded into the I/O FIFO Queue 102 via Interface 104. The circuitry used to direct the memory request to the desired queue in the Main Storage Memory Queue 42 is discussed in the description of FIG. 7.

By separating the instruction processor (IP-A1 58 and IP-A2 60) memory requests from the input/output (IOA-A 68) memory requests, I/O requests or IP requests can be given priority over the other. In other words, one queue can be used to access the main storage (MSU-A1 64 and MSU-A2 66) while memory request operation from the other queue is temporarily suspended. Therefore, subsequent I/O memory requests can access the main storage prior to IP memory requests which are already in the IP FIFO Queue 98.

The instruction processor output register, labeled IP REG 106, receives and latches the memory request from the IP FIFO Queue 98 that has been in the IP FIFO Queue for the longest time. Similarly, the input/output output register, labeled I/O REG 108, latches the memory request from the I/O FIFO Queue 102 that has been in the I/O FIFO Queue for the longest time. The IP FIFO Queue 98 and the I/O FIFO Queue 102 are shown in FIG. 5 to hold four and three memory requests respectively, but the size of the queue could be as large as needed or desired. The multiplexer labeled MUX 110 then selects a memory request from either the IP REG 106 or the I/O REG 108 depending on the state of a control signal on Line 112. The control signal is generated at the Queue Priority 114, which determines whether the IP memory request in the IP REG 106 or the I/O memory request in the I/O REG 108 will be chosen. The details of the Queue Priority 114 operation are more fully discussed in the description of FIG. 6.

Once the Queue Priority 114 has determined which memory request will be selected by MUX 110, MUX 110 sends the memory request to the MSU Register 116 to be latched. The memory request then accesses the required data from the main storage, which in the preferred embodiment comprises two memory elements, labeled MSU-A1 64 and MSU-A2 66.

Figures 6, 10:
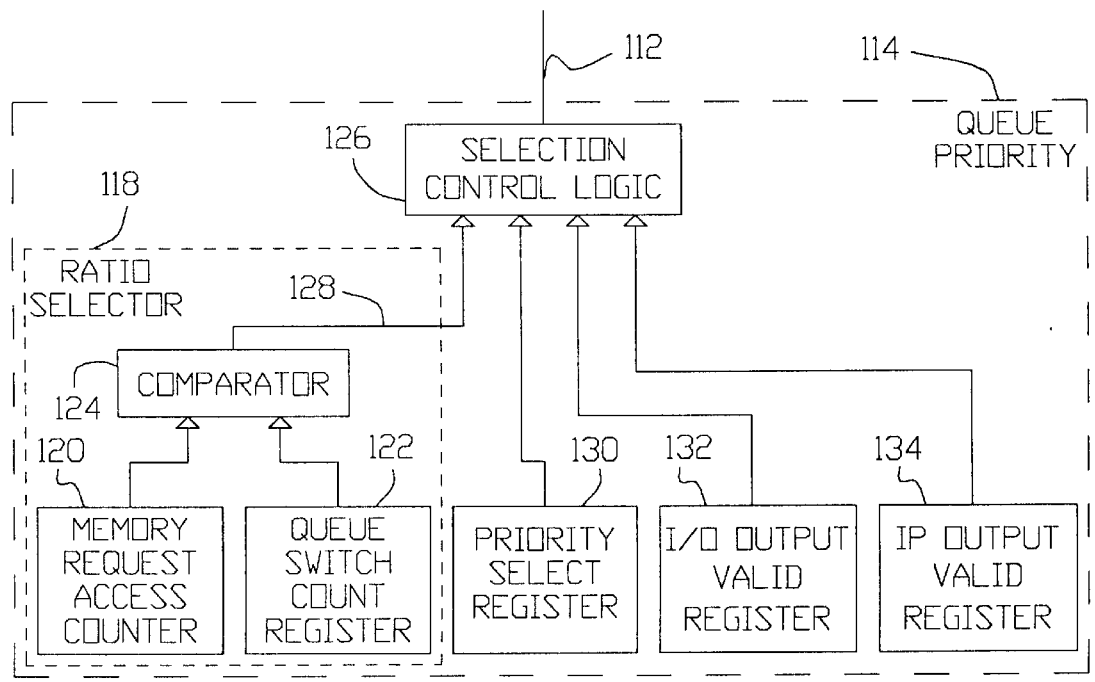
FIG. 6 is a block diagram of the Queue Priority logic, which specifies which memory queue will supply a memory request to the main storage.
FIG. 10 is a truth table indicating the memory queue that will be selected by the Queue Write Selection Logic in response to the various states of the I/O MEMORY REQUEST, REMOTE INTERFACE, IP QUEUE CONFLICT, and I/O QUEUE CONFLICT signals.

FIG. 6 is a block diagram of the Queue Priority 114 logic, which specifies which memory queue will supply a memory request to the main storage. The main component in the Queue Priority 114 is the Ratio Selector 118. It comprises the Memory Request Access Counter 120, the Queue Switch Count Register 122, and a Comparator 124. The Memory Request Access Counter 120 counts the total number of memory requests (IP and I/O requests) that are made to the MSU Register 116. The Queue Switch Count Register 122 stores a predetermined value that is compared to the current value of the Memory Request Access Counter 120. Comparator 124 is coupled to the Memory Request Access Counter 120 and the Queue Switch Count Register 122 to make the comparison. The Memory Request Access Counter 120 increments each time a memory request is made, and when its value equals that of the Queue Switch Count Register 122, the Comparator 124 output switches it's logic state, and sends a QUEUE SWITCH signal to the Selection Control Logic 126 on Line 128. This signals the Selection Control Logic 126 to change the logic state of the control signal on Line 112 to MUX 110 (FIG. 5), so that a memory request from the other queue is allowed to access the main storage. The Memory Request Access Counter then resets, and the Comparator 124 output switches back to its original logic state. The Ratio Selector 118 therefore switches the state of the signal on Line 128 every N-th memory request, where N is the value stored in the Queue Switch Count Register 122.

The Priority Select Register 130 sends a signal to the Selection Control Logic 126 to indicate which queue will be selected when the Comparator 124 output on Line 128 is at a low logic level, and which queue will be selected when the Comparator 124 output is at a high logic level. For example, a low logic level in the Priority Select Register 130 could be used to indicate that a low logic level on Line 128 will select the memory request from the I/O REG 108, and a high logic level on Line 128 will select the memory request from the IP REG 106. Conversely, a high logic level in the Priority Select Register 130 would then be used to indicate that a high logic level on Line 128 will select the I/O REG 108 memory request, and a low logic level on that line will select the IP REG 106 memory request.

The combined effect of the Ratio Selector 118 and the Priority Select Register 130 is that a ratio of IP to I/O memory requests can be established. This is used to allow either IP or I/O memory requests to be given a "preemptive priority" over the other, where this preemptive priority is determined by the ratio chosen in the Ratio Selector 118. For example, assume that a low logic level is latched in the Priority Select Register 130, and this signifies that a low logic level from the Comparator 124 on Line 128 will select memory requests from the I/O REG 108. Also assume that the ratio desired is three I/O memory requests to every one IP memory request. In such a case, the Queue Switch Count Register 122 will be loaded with a count of three. The Memory Request Access Counter 120 will then increment from zero up to three on each occurrence of an I/O memory request to the main storage (incrementing takes place on the occurrence of an "I/O memory request" due to the state of the Priority Select Register). When the Comparator 124 realizes that both the Memory Request Access Counter 120 and the Queue Switch Count Register 122 are outputting the value "3", the Comparator 124 will switch it's output on Line 128 to a high logic level. This will cause the Selection Control Logic 126 to change logic states, and will in turn cause the MUX 110 (see FIG. 5) to select a memory request from the IP REG 106. The Memory Request Access Counter 120 then switches back to a value of zero, the Comparator 124 output on Line 128 switches back to a logic zero, and the process starts over again. This results in the acceptance of three I/O memory requests to every one IP memory request. If the Priority Select Register 130 was switched from it's present logic state to the opposite logic state, the result would be that three IP memory requests would be accepted for every I/O memory request.

The ability to change the Priority Select Register 130 and the Queue Switch Count Register 122 allows the ratio of memory requests of one queue versus another to be set at whatever is desired. For instance, the Queue Switch Count Register 122 could be set to "10", wherein the ratio of memory request acceptance from the two queues would be 10:1. The Priority Select Register 130 can also be changed to allow either memory queue to be the one to get the higher preemptive priority. The Queue Switch Count Register 122 and the Priority Select Register 130 could be changed dynamically, that is, during normal system operation. Any method known in the art to load registers can be used to dynamically change the values in the Queue Switch Count Register 122 and the Priority Select Register 130. In the preferred embodiment, the Queue Switch Count Register 122 and the Priorty Select Register 130 are only changed during initialization of the system or during maintenance periods. However, the operation of the invention will be the same whether the registers are loaded dynamically or during initialization/maintenance periods. The memory request characteristics of the specific system can be monitored, and the Queue Switch Count Register 122 and the Priority Select Register 130 can be modified to reflect these system characteristics. For example, if the system generally appears to make twice as many I/O memory requests as IP memory requests, the Priority Select Register 130 can be set to give the I/O REG 108 preemptive priority over IP memory requests, and the Queue Switch Count Register 122 can be set to a value of "2". This results in the most efficient use of memory accesses to the main storage, and minimizes memory queue backlogs.

The Queue Priority 114 also contains an I/O Output Valid Register 132, and an IP Output Valid Register 134. These registers indicate whether a memory request is present in its respective memory queue. The I/O Output Valid Register 132 drives a signal to the Selection Control Logic 126 to indicate whether a memory request is present in the I/O REG 108, and the IP Output Valid Register 134 indicates to the Selection Control Logic 126 whether a memory request is present in the IP REG 106. The I/O Output Valid Register 132 and the IP Output Valid Register 134 direct the Selection Control Logic 126 to ignore a request from the Ratio Selector 118 to switch to a memory queue when there are no memory requests queued within it. For instance, where there are no memory requests queued in the IP REG 106, the IP Output Valid Register 134 will indicate to the Selection Control Logic 126 that only I/O memory requests in the I/O FIFO Queue 102 should be processed until an IP memory request becomes available in the IP REG 106. At that point, the Ratio Selector 118 would again determine which memory requests will be processed.

From the foregoing description of the Queue Priority 114, the combinatorial logic required in the Selection Control Logic 126 would be easily recognized by one skilled in the art. The signal on Line 128 from the Ratio Selector 118 is the main signal to control the MUX 110, and the Priority Select Register 130, the I/O Output Valid Register 132, and the IP Output Valid Register 134 simply invert the active logic level or override the signal on Line 128. When an active signal is present in the I/O Output Valid Register 132 or the IP Output Valid Register 134, it overrides the signal from the Ratio Selector 118. This can be accomplished by having the Selection Control Logic 126 simply disable the signal on Line 128, and drive a fixed logic signal on Line 112 to the MUX 110. The signal from the Priority Select Register 130 can be inverted within the Selection Control Logic 126 to accomplish its goal. Any other type of combinatorial logic known to one skilled in the art could also be employed to perform the foregoing described functions.

Figure 7:
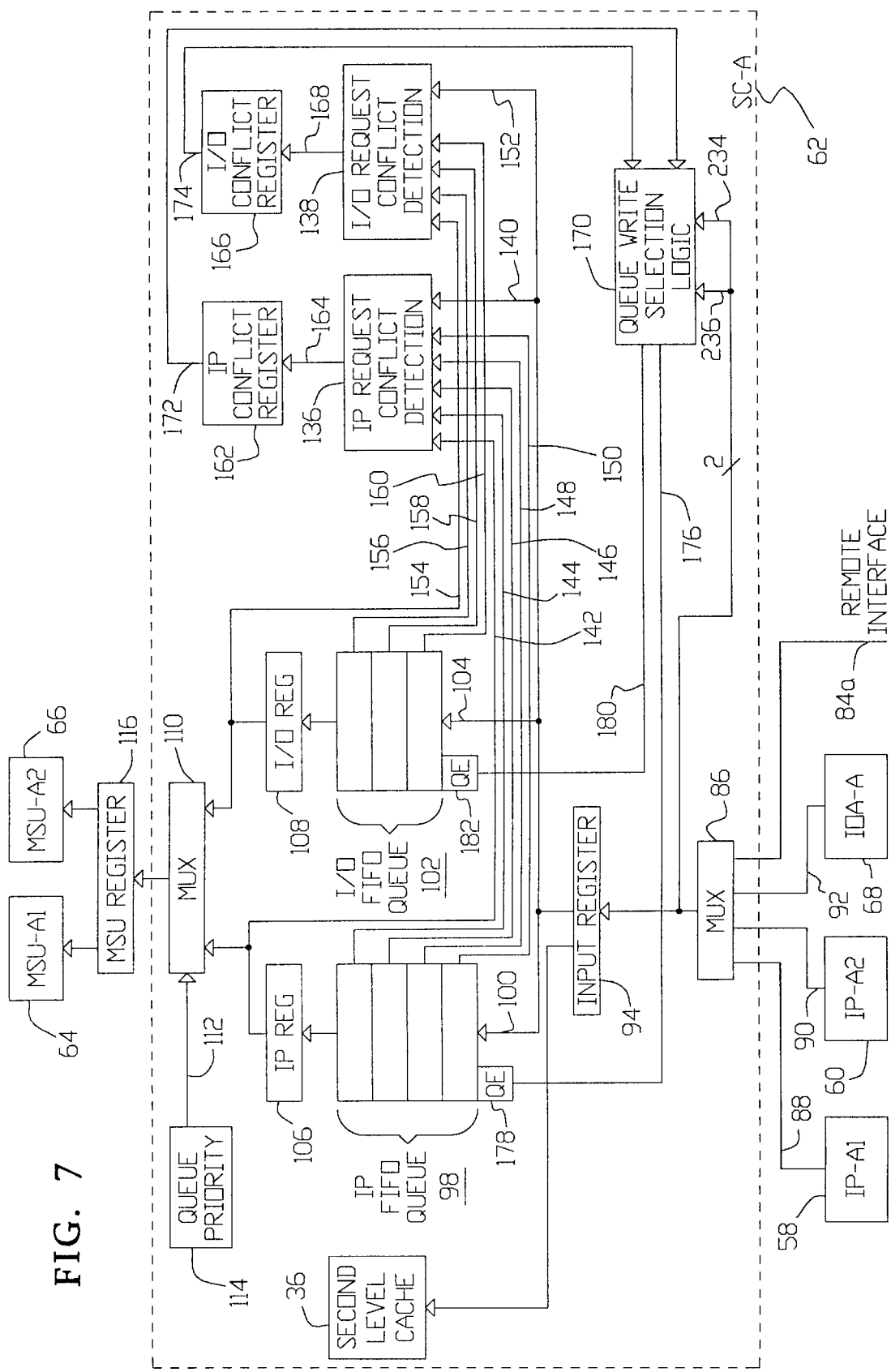
FIG. 7 is a block diagram of the invention which further implements address conflict detection circuitry.

FIG. 7 is a block diagram of the invention which further implements address conflict detection circuitry. Conflict detection circuitry is implemented to prevent "out-of-order" memory accesses from the main storage. In prior art comprising a single first-in, first-out (FIFO) memory queue, all memory requests are processed in the order that they occur. However, where parallel queues are used, it is possible that one queue with priority could access the main memory and access invalid data, because another memory queue at a lower priority should have previously updated the data at that address. A memory request to the same address as a preceding memory request already stored in one of the memory queues is referred to as a "conflict". In order to ensure proper FIFO ordering in a parallel FIFO queue structure, any "conflicting" memory requests must be placed in the same memory queue. This will allow main memory accesses to occur in the order that was intended. For instance, if an I/O memory request references the same address as an IP memory request already in the IP FIFO Queue 98, the I/O memory request will also be placed in the IP FIFO Queue 98 instead of the I/O FIFO Queue 102. Similarly, if an IP memory request references the same address as an I/O memory request already in the I/O FIFO Queue 102, the IP memory request will be placed in the I/O FIFO Queue 102.

FIG. 7 is similar to FIG. 5, but includes circuitry to manage address conflicts. As seen in FIG. 7, the storage controller labeled SC-A 62 includes IP Request Conflict Detection 136 and I/O Request Conflict Detection 138. These circuits monitor the queue addresses to determine whether any of them equal the awaiting memory request in the Input Register 94. The IP Request Conflict Detection 136 circuitry monitors for an Input Register 94 memory request on Interface 140 that is equal to one of the IP FIFO Queue 98 memory requests on Interfaces 142, 144, 146, 148 and 150. The I/O Request Conflict Detection 138 circuitry monitors for an Input Register 94 memory request on Interface 152 that is equal to one of the I/O FIFO Queue 102 memory requests on Interfaces 154, 156, 158 and 160.

The output signal from the IP Request Conflict Detection 136 is sent to the IP Conflict Register 162 via Line 164, and the output signal from the I/O Request Conflict Detection 138 is sent to the I/O Conflict Register 166 via Line 168. The IP Conflict Register 162 and the I/O Conflict Register 166 latch the signals from Lines 164 and 168 respectively, and then drive these signals to the Queue Write Selection Logic 170 via Lines 172 and 174 respectively. The Queue Write Selection Logic 170 determines which of the memory queues should be enabled to access the main storage. The IP QUEUE ENABLE signal on Line 176 is driven to the IP FIFO Queue 98 enable, labeled QE 178, and the I/O QUEUE ENABLE signal on Line 180 is driven to the I/O FIFO Queue 102 enable, labeled QE 182. The queue enables, QE 178 and QE 182, allow their respective memory queues to clock in the memory request from the Input Register 94.

Figure 8:
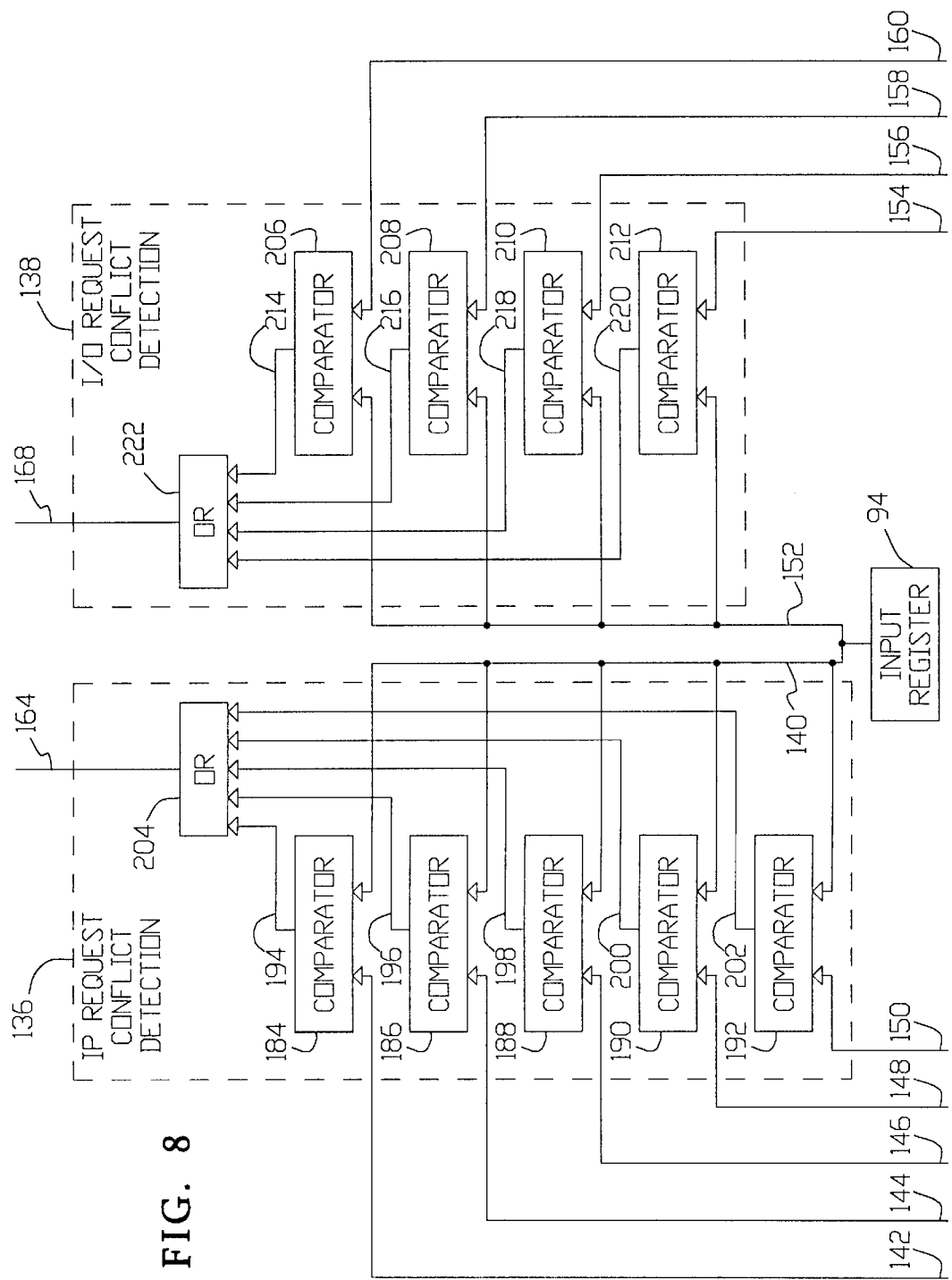
FIG. 8 is a block diagram of the IP Request Conflict Detection and the I/O Request Conflict Detection circuitry.

FIG. 8 is a block diagram of the IP Request Conflict Detection 136 and the I/O Request Conflict Detection 138 circuitry. Within each conflict detection circuit is a set of comparators, for comparing the memory request in the Input Register 94 to the memory requests stored in its respective memory queue. The IP Request Conflict Detection 136 circuit includes five comparators, labeled Comparators 184, 186, 188, 190 and 192. Each comparator in the IP Request Conflict Detection 136 circuitry compares the memory request on Interface 140 from the Input Register 94 to one of the memory requests stored in the IP FIFO Queue 98. The memory request from the Input Register 94 is sent to each of the five Comparators, and is compared to the memory request on Interface 142 at Comparator 184, the memory request on Interface 144 at Comparator 186, the memory request on Interface 146 at Comparator 188, the memory request on Interface 148 at Comparator 190, and the memory request on Interface 150 at Comparator 192. Each Comparator outputs a signal that indicates whether the memory request from the Input Register 94 equals its corresponding memory request from the IP FIFO Queue 98. Each of these Comparator output signals, on Lines 194, 196, 198, 200 and 202, is coupled to the OR-gate labeled OR 204. Therefore, if any of the memory requests in the IP FIFO Queue 98 are equal to the memory request from the Input Register 94, OR 204 will output an active IP REQUEST CONFLICT signal on Line 164.

The I/O Request Conflict Detection 138 circuit includes four comparators, labeled Comparators 206, 208, 210 and 212. Each comparator in the I/O Request Conflict Detection 138 circuitry compares the memory request on Interface 152 from the Input Register 94 to one of the memory requests stored in the I/O FIFO Queue 102. The memory request from the Input Register 94 is sent to each of the four Comparators, and is compared to the memory request on Interface 160 at Comparator 206, the memory request on Interface 158 at Comparator 208, the memory request on Interface 156 at Comparator 210, and the memory request on Interface 154 at Comparator 212. Each Comparator outputs a signal that indicates whether the memory request from the Input Register 94 equals its corresponding memory request from the I/O FIFO Queue 102. Each of these Comparator output signals, on Lines 214, 216, 218 and 220, is coupled to the OR-gate labeled OR 222. Therefore, if any of the memory requests in the I/O FIFO Queue 102 are equal to the memory request from the Input Register 94, OR 222 will output an active I/O REQUEST CONFLICT signal on Line 168.

The IP REQUEST CONFLICT signal on Line 164 and the I/O REQUEST CONFLICT signal on Line 168 are sent to the IP Conflict Register 162 and the I/O Conflict Register 166 respectively. The IP Conflict Register 162 and the I/O Conflict Register 166 in turn send the signals to the Queue Write Selection Logic 170. The IP QUEUE CONFLICT signal is sent from the IP Conflict Register 162 to the Queue Write Selection Logic 170 via Line 172. The I/O QUEUE CONFLICT signal is sent from the I/O Conflict Register 166 to the Queue Write Selection Logic 170 across Line 174. The Queue Write Selection Logic 170 recognizes the conflict signals, and enables the appropriate memory queue.

Figure 9:
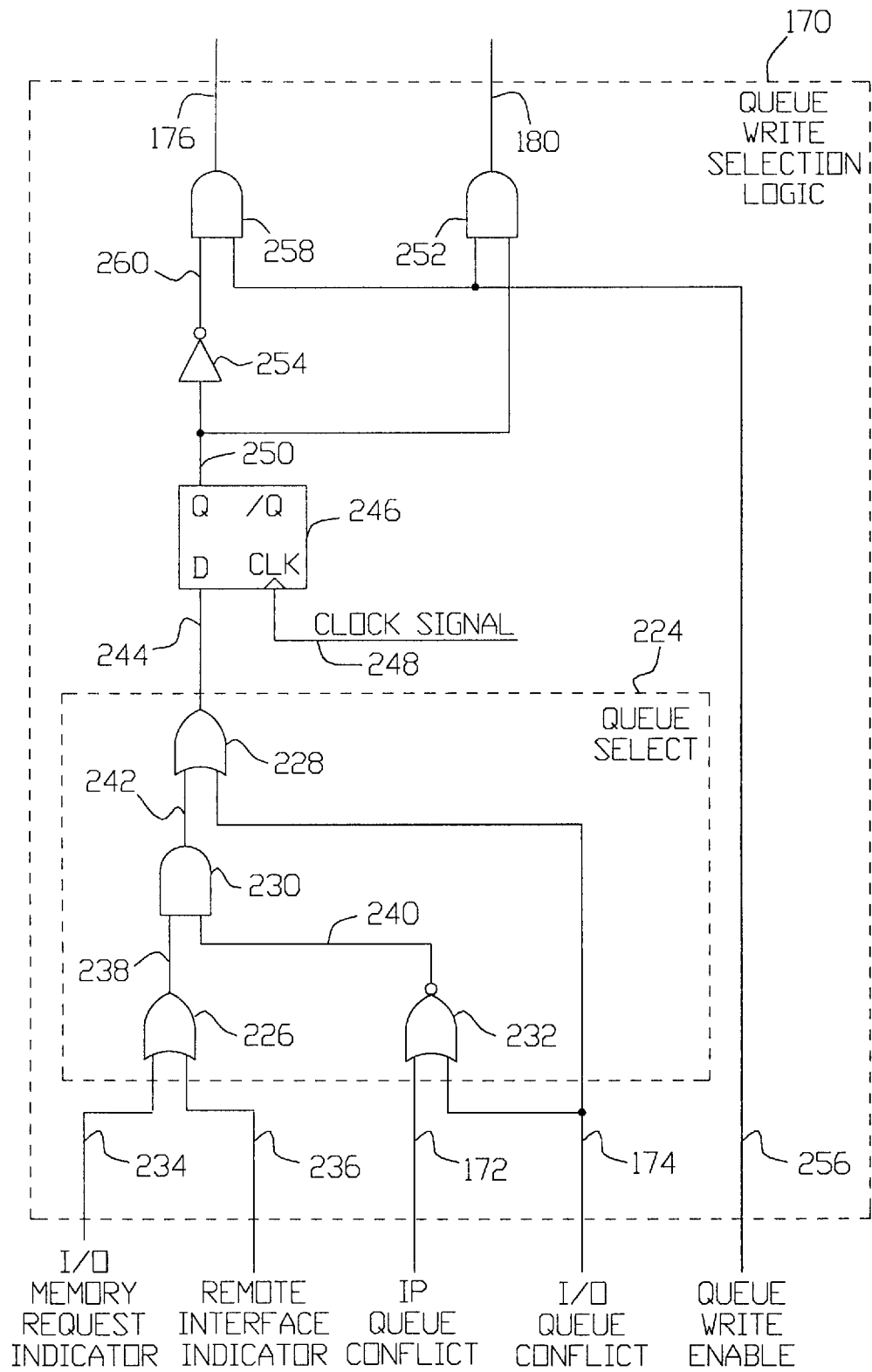
FIG. 9 is a schematic diagram of the Queue Write Selection Logic.

FIG. 9 is a schematic diagram of the Queue Write Selection Logic 170. The Queue Write Selection Logic 170 generates the IP QUEUE ENABLE signal on Line 176, and the I/O QUEUE ENABLE signal on Line 180. These signals enable either the IP FIFO Queue 98 or the I/O FIFO Queue 102, depending on the type of memory request entering the Input Register 94, and also depending on whether any "conflicts" were discovered by the IP Request Conflict Detection 136 or the I/O Request Conflict Detection 138.

Included within the Queue Write Selection Logic 170 is the Queue Select 224 combinatorial logic. The Queue Select 224 circuitry consists of two OR-gates (Or 226 and Or 228), an AND-gate (And 230) and a NOR-gate (Nor 232). The I/O MEMORY REQUEST INDICATOR signal on Interface 234 and the REMOTE INTERFACE INDICATOR signal on Interface 236 are inputs to Or 226. These indicators are part of each memory request selected by MUX 86. In other words, two bits of the memory request selected by MUX 86 are used to indicate to the Queue Write Selection Logic 170 which memory request was selected by the MUX 86. If Interface 234 or 236 indicate an active I/O MEMORY REQUEST INDICATOR or REMOTE INTERFACE INDI- CATOR signal, the output of Or 226 will be set to a high logic level. The output of Or 226 is connected to And 230 by way of Line 238. The other input to And 230 is supplied by Nor 232 via Line 240. Where neither the IP QUEUE CONFLICT signal on Line 172 nor the I/O QUEUE CONFLICT signal on Line 174 indicate a conflict, Nor 232 will output a high logic level on Line 240 to And 230. Where there are no conflicts, and either an I/O MEMORY REQUEST INDICATOR or a REMOTE INTERFACE INDICATOR signal is present, And 230 will output a high logic level to Or 228 via Line 242, which will in turn drive a high logic level across Line 244 to the D input of the Flip-flop 246. The next active triggering edge of the CLOCK SIGNAL on Line 248 will cause a high logic level to be sent across Line 250 to And 252, and a high logic level to be sent to the Inverter 254. The QUEUE WRITE ENABLE signal on Line 256 will be at a high logic level any time that either memory queue is being written to. And 252 will therefore output an active I/O QUEUE ENABLE signal on Line 180, which will enable the I/O FIFO Queue 102 to receive the memory request from the Input Register 94. The Inverter 254 will send a low logic level to And 258 via Line 260, causing it to output an inactive, low logic level as the IP QUEUE ENABLE signal on Line 176, and will therefore disable the IP FIFO Queue 98 from receiving the memory request from the Input Register 94.

A second way for the Flip-flop 246 to have a high logic level at its D input, and therefore enabling the I/O FIFO Queue 102, is for an I/O QUEUE CONFLICT on Line 174 to be present. An active I/O QUEUE CONFLICT signal indicates that the I/O Request Conflict Detection 138 circuitry has detected a memory request in the I/O FIFO Queue 102 to be equal to the memory request in the Input Register 94. In such a case, the memory request in the Input Register 94 must be stored in the I/O FIFO Queue 102. A high logic level at the D input of the Flip-flop 246 will cause the I/O QUEUE ENABLE signal on Line 180 to become active, and will allow the memory request in the Input Register 94 to be stored in the I/O FIFO Queue 102.

Where no conflicts are present, and where no I/O MEMORY REQUEST INDICATOR or REMOTE INTERFACE INDICATOR signal is present, the D input to the Flip-flop 246 will be held at a low logic level. This will enable the IP QUEUE ENABLE signal on Line 176, and will disable the I/O QUEUE ENABLE signal on Line 180. Furthermore, the presence of an IP QUEUE CONFLICT signal on Line 172 will cause the Nor 232 to output a low logic level to And 230, which will also result in the enabling of the IP FIFO Queue 98 and the disabling of the I/O FIFO Queue 102.

FIG. 10 is a truth table indicating the memory queue that will be selected by the Queue Write Selection Logic 170 in response to the various states of the I/O MEMORY REQUEST INDICATOR, REMOTE INTERFACE INDICATOR, IP QUEUE CONFLICT, and I/O QUEUE CONFLICT signals. As can be seen, any time that an I/O QUEUE CONFLICT signal is present, the I/O FIFO Queue 102 will be selected. When an IP QUEUE CONFLICT signal is present, the IP FIFO Queue 98 will be selected. When neither the IP QUEUE CONFLICT signal or the I/O QUEUE CONFLICT signal is present, the memory queue selected will depend on whether an I/O MEMORY REQUEST INDICATOR or a REMOTE INTERFACE INDICATOR signal is present. The situation should never arise where both the IP QUEUE CONFLICT and I/O QUEUE CONFLICT signals are simultaneously active, since this would indicate that like memory requests are present in both memory queues, and this will not happen since like memory requests must be placed in the same memory queue. These situations are shown in FIG. 10 as "Not Applicable", and are labeled "NA". Furthermore, the simultaneous occurrence of both an I/O MEMORY REQUEST INDICATOR signal and a REMOTE INTERFACE INDICATOR signal will not occur, since the memory requests are viewed one at a time. These situations are also shown as a "Not Applicable" (NA) condition in FIG. 10.

Returning to FIG. 7, the IP QUEUE ENABLE signal on Line 176 and the I/O QUEUE ENABLE signal on Line 180 are sent to the IP queue enable, labeled QE 178, and the I/O queue enable, labeled QE 182, respectively. An active queue enable signal will direct the associated queue enable logic to allow the memory queue to receive the memory request from the Input Register 94.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A memory request storage and allocation apparatus, for use in a system having multiple memory requesting devices, and having one or more main storage devices, the apparatus comprising:

a plurality of parallel queues, each individual one of said plurality of parallel queues having a queue input terminal coupled to one or more of said memory requesting devices to receive memory access requests, and each individual one of said plurality of parallel queues further having a queue output terminal to transmit said memory access requests;

a multiplexer having a plurality of multiplexer input terminals, each individual one of said plurality of multiplexer input terminals coupled to an associated one of said queue output terminals to receive said memory access requests, and also having a control input terminal to receive one or more control signals, and further having a multiplexer output terminal for transmitting one of said memory access requests to said main storage devices in response to said one or more control signals; and queue control circuitry, coupled to said control input terminal, said queue control circuitry having a ratio selector having control registers to store loadable data defining the logic state of said one or more control signals, said queue control circuitry further having a control circuit output terminal to transmit said one or more control signals to said multiplexer to control, according to said loadable data, the ratio in which said memory access requests are selected from among said plurality of parallel queues.

2. The memory request storage and allocation apparatus as in claim 1, wherein said plurality of parallel queues comprise a first queue and a second queue.

3. The memory request storage and allocation apparatus as in claim 2, wherein said ratio selector further comprises:

a count register, having count register input terminals to receive a programmable queue ratio indicative of said ratio in which said memory access requests are selected from among said plurality of parallel queues, and having count register output terminals to transmit said queue ratio;

a counter to receive programmable count signals, said counter to modify said count signals by a predetermined number each time said one of said memory access requests is transmitted to said main storage devices, said counter further having output terminals to transmit said modified count signals; and a comparator, coupled to said count register and having a first comparator input terminal to receive said queue ratio, and coupled to said counter and having a second comparator input terminal to receive said modified count signals, and further having a comparator output terminal to transmit a first logic signal to said control circuit output terminal when said queue ratio and said modified count signals are not equal, and to transmit a second logic signal to said control circuit output terminal when said queue ratio and said modified count signals are equal, whereby said first logic signal directs said multiplexer to select one of said memory access requests from said first queue, and said second logic signal directs said multiplexer to select one of said memory access requests from said second queue.

4. The memory request storage and allocation apparatus as in claim 3, wherein said queue output terminal of each one of said plurality of parallel queues transmits said memory access requests in the order that they were received by said queue input terminal.

5. The memory request storage and allocation apparatus as in claim 3, further comprising selection control logic coupled to said ratio selector and said control registers in said queue control circuitry, said selection control logic having circuitry to generate said one or more control signals in response to said first logic signal, said second logic signal, and said programmable data, and farther having a control logic output terminal coupled to said control circuit output terminal to transmit said one or more control signals to said control input terminal of said multiplexer.

6. The memory request storage and allocation apparatus as in claim 2, further comprising:

an input multiplexer coupled to each of said memory requesting devices to receive said memory access requests, having an input multiplexer control input to receive input multiplexer control signals and to select one of said memory access requests in response thereto, and further having an output terminal to output selected one of said memory access requests to said first queue and said second queue;

queue-selection means, coupled to said memory requesting devices, for receiving said memory access requests and generating in response thereto a queue enable signal;

first-queue-enable means coupled to said first queue and to said queue-selection means, for enabling said first queue to receive said selected one of said memory access requests upon recognition of a first logic state of said queue enable signal; and second-queue-enable means coupled to said second queue and to said queue-selection means, for enabling said second queue to receive said selected one of said memory access requests upon recognition of a second logic state of said queue enable signal.

7. A memory request storage and allocation apparatus, for use in a system having multiple memory requesting devices, and having one or more main storage devices, the apparatus comprising:

a first queue including a first queue input coupled to one or more of said memory requesting devices to receive corresponding memory access requests, and further having a plurality of first memory request registers to store first queued memory access requests, and also having a first queue output to transmit said first queued memory access requests;

a second queue including a second queue input coupled to one or more of said memory requesting devices to receive corresponding memory access requests, and further having a plurality of second memory request registers to store second queued memory access requests, and also having a second queue output to transmit said second queued memory access requests;

a multiplexer having a first multiplexer input and a second multiplexer input, said first multiplexer input coupled to said first queue output to receive said first queued memory access requests, and said second multiplexer input coupled to said second queue output to receive said second queued memory access requests, and further having a control input to receive a control signal, and also having a multiplexer output to transmit said first queued memory access requests to said main storage devices when said control signal is at a first logic state, and to transmit said second queued memory access requests from said second queue output to said main storage devices when said control signal is at a second logic state;

conflict-detection means, coupled to said memory requesting devices, and coupled to each one of said plurality of first memory request registers and said plurality of second memory request registers, for comparing said memory access requests to said first queued memory access requests and to said second queued memory access requests, and for generating conflict signals in response thereto;

queue-selection means, coupled to said conflict-detection means, for receiving said conflict signals, and for generating queue enable signals in response thereto; and queue-enable means, coupled to said first queue and said second queue, and coupled to said queue-selection means, for receiving said queue enable signals, and for enabling said first queue or said second queue to receive said memory access requests depending on the logic state of said queue enable signals.

8. The memory request storage and allocation apparatus as in claim 7, wherein said conflict-detection means includes:

first-conflict-detection means, coupled to each one of said plurality of first memory request registers and to said memory requesting devices, for comparing the most recent one of said memory access requests with each one of said first queued memory access requests, and for generating a first active conflict signal upon detection of one or more equal ones of said memory access requests and said first queued memory access requests, and for generating a first inactive conflict signal upon detection of no equal ones of said memory access requests and said first queued memory access requests; and second-conflict-detection means, coupled to each one of said plurality of second memory request registers and to said memory requesting devices, for comparing the most recent one of said memory access requests with each one of said second queued memory access requests, and for generating a second active conflict signal upon detection of one or more equal ones of said memory access requests and said second queued memory access requests, and for generating a second inactive conflict signal upon detection of no equal ones of said memory access requests and said second queued memory access requests.

9. The memory request storage and allocation apparatus as in claim 8, wherein said first-conflict-detection means includes:

a plurality of first comparators, each coupled to said memory requesting devices, and each coupled to a different one of said plurality of first memory request registers to compare each one of said first queued memory access requests to an active one of said memory access requests, and each one of said plurality of first comparators having a first comparator output to transmit first comparator signals; and means connected to each of said first comparator outputs for receiving said first comparator signals, and for generating said first active conflict signal upon detection of an active logic level on one or more of said first comparator signals.

10. The memory request storage and allocation apparatus as in claim 9, wherein said second-conflict-detection means includes:

a plurality of second comparators, each coupled to said memory requesting devices, and each coupled to a different one of said plurality of second memory request registers to compare each one of said second queued memory access requests to an active one of said memory access requests, and each one of said plurality of second comparators having a second comparator output to transmit second comparator signals; and means connected to each of said second comparator outputs for receiving said second comparator signals, and for generating said second active conflict signal upon detection of an active logic level on one or more of said second comparator signals.

11. The memory request storage and allocation apparatus as in claim 7, further comprising queue-control means, coupled to said control input, for generating said control signal.

12. The memory request storage and allocation apparatus as in claim 11, wherein said queue-control means includes a ratio selector comprising:

a count register, having count register inputs to receive a predetermined count value, and having count register outputs to transmit said predetermined count value;

a counter to modify a previous count value by a predetermined value when one of said memory access requests is transmitted to said main storage devices, and having counter outputs to transmit a current count value; and a comparator, coupled to said count register and having a first comparator input to receive said predetermined count value, and coupled to said counter and having a second comparator input to receive said current count value, and further having a comparator output to transmit a first logic state as said control signal when said predetermined count value and said current count value are not equal, and to transmit a second logic state as said control signal when said predetermined count value and said current count value are equal, whereby said first logic state directs said multiplexer to select one of said first queued memory access requests, and said second logic state directs said multiplexer to select one of said second queued memory access requests.

13. The memory request storage and allocation apparatus as in claim 8, wherein said queue-selection means comprises:

queue-designation means for receiving the most recent one of said memory access requests, and for generating a queue designation signal to initially indicate whether the most recent one of said memory access requests is to be placed in said first queue or said second queue;

conflict-override means, for receiving said first active conflict signal and for generating in response thereto a first override signal to override the queue designation indicated by said queue designation signal, and for receiving said second active conflict signal and for generating in response thereto a second override signal to override the queue designation indicated by said queue designation signal;

latching means, coupled to said queue-designation means and to said conflict-override means, for latching said queue designation signal, or for latching said first override signal or said second override signal in response to said first active conflict signal or said second active conflict signal respectively; and queue-enable-signal-output means, coupled to said latching means, for transmitting said queue enable signals in response to the signal latched by said latching means.

14. A data queuing apparatus, for use in a system having multiple data sources, and having a data destination for the data supplied by the multiple data sources, the data queuing apparatus comprising:

a plurality of parallel data queues, each having a plurality of data storage areas, and each coupled to one or more of said data sources to store said data supplied by said data sources in said plurality of data storage areas;

a plurality of register means, each one of said plurality of register means coupled to a different one of said plurality of parallel data queues, for retaining said data from one of said data storage areas in its respective one of said plurality of parallel data queues;

data-selection means, coupled to said plurality of register means, and coupled to said data destination, for selecting said data from one of said plurality of register means in response to one or more control signals, and for transmitting said selected data to said data destination; and queue-control means, coupled to said data-selection means, for receiving programmable control data indicative of one or more queue ratios, and for generating said one or more control signals for causing said data-selection means to select data such that the number of selections from each of said plurality of register means as compared to the total number of selections is determined by a corresponding one of said one or more queue ratios.

15. The data queuing apparatus as in claim 14, wherein said queue-control means comprises:

a plurality of count-register means for receiving and storing a like number of predetermined count values;

counter means for generating a current count value by altering a previous count value each time said selected data is transmitted to the data destination; and comparing means, coupled to said plurality of count-register means and to said counter means, for receiving said predetermined count values and said current count value respectively, and for activating a different one of said control signals each time said current count value equals one of said predetermined count values.

16. The data queuing apparatus as in claim 15, wherein said queue-control means further comprises override-register means, for directly activating any one of said control signals in lieu of said comparing means activating said control signals.

17. The data queuing apparatus as in claim 14, further comprising:
  input-selection means, coupled to said data sources, for selecting said data from one of said data sources, and for providing selected data to one of said plurality of parallel data queues in response thereto;
  queue-selection means, coupled to said data sources, for receiving said data from said data sources, and for generating in response thereto a plurality of queue enable signals; and
  a plurality of queue-enable means, one of said plurality of queue-enable means coupled to a different one of said plurality of parallel data queues, for receiving said queue enable signals, and for enabling one of said plurality of parallel data queues to retain said selected data when its corresponding one of said queue enable signals is active.

18. A queue selection apparatus, for use in a system retaining data in a first queue and a second queue, wherein the system includes a multiplexer for selecting data from the first queue or the second queue to be transmitted to a memory during a transfer operation, and wherein the multiplexer has a control input terminal for receiving a signal to control data selection, the queue selection apparatus comprising:
  ratio-selection means for alternately generating a first control signal for a first predetermined number of transfer operations and a second control signal for a second predetermined number of transfer operations;
  queue-priority means for providing a third control signal; and
  selection-control means, coupled to said ratio-selection means to receive said first control signal and said second control signal, and coupled to said queue-priority means to receive said third control signal, and further coupled to the control input terminal of the multiplexer, for alternately transmitting said first control signal and said second control signal to the control input terminal when said third control signal is at a first logic state, and for alternately transmitting an inverted said first control signal and an inverted said second control signal to the control input terminal when said third control signal is at a second logic state.

19. The queue selection apparatus as in claim 18, wherein said ratio-selection means comprises:
  count-register means for receiving and storing a predetermined queue ratio indicative of the ratio between said first number of transfer operations and said second number of transfer operations;
  counter means for containing count data signals and for generating current count data signals by performing a predetermined modification to said count data signals for each of the transfer operations; and
  comparing means, coupled to said count-register means and to said counter means, for receiving said predetermined queue ratio and said current count data signals respectively, and for activating said first control signal during the time said current count data signals have a first predetermined relationship to said predetermined queue ratio, and for activating said second control signal during the time said current count data signals have a second predetermined relationship to said predetermined queue ratio.

20. The queue selection apparatus as in claim 19, wherein said counter means generates said current count data signals by incrementing said count data signals by one.

21. The queue selection apparatus as in claim 18, further comprising:
  first-queue-validity means, coupled to said selection-control means, for providing a fourth control signal to said selection-control means when said first queue is devoid of said data, and for causing said selection-control means to transmit only said second control signal to said control input when said fourth control signal is present; and
  second-queue-validity means, coupled to said selection-control means, for providing a fifth control signal to said selection-control means when said second queue is devoid of said data, and for causing said selection-control means to transmit only said first control signal to said control input when said fifth control signal is present.

22. A method of providing a plurality of incoming addresses to a memory, comprising the steps of:
  (a) selecting one of said plurality of incoming addresses to provide a selected incoming address;
  (b) classifying said selected incoming address to provide a classified address;
  (c) storing said classified address in a correspondingly-classified one of a plurality of memory address queues;
  (d) preselecting count values to provide a plurality of preselected count values;
  (e) generating a current count value by modifying a previous count value;
  (f) comparing said current count value to each of said preselected count values;
  (g) generating queue switch signals upon detection of a predetermined relationship between said current count value and said preselected count values by said step of comparing;
  (h) selecting a different one of said classified addresses from one of said plurality of memory address queues for each different one of said queue switch signals; and
  (i) repeating steps (a) through (h) as long as at least one of said plurality of incoming addresses is present to be selected in said step (a).

23. The method as defined by claim 22, wherein said step of classifying comprises the steps of:
  comparing said selected incoming address with each of said classified addresses in all of said plurality of memory address queues to determine whether said selected incoming address is equal to any of said classified addresses; and
  classifying said selected incoming address to equal the classification of said classified address found to be equivalent to said selected incoming address.

24. For use with a memory request storage and allocation system having a memory and a plurality of devices capable of making access requests to the memory wherein each access request is associated with a memory address, the system further having a plurality of memory address queues each for storing selected ones of the memory addresses, and further having a queue selection apparatus to select one of the plurality of memory address queues as the current queue, the queue selection apparatus having a storage device to store one or more queue ratios, wherein each queue ratio is indicative of the number of times an associated one of the plurality of memory address queues is selected as the current queue compared to the total number of selections made, the queue selection apparatus further having a counter to store count data signals, a method of providing the memory addresses to the memory, comprising the steps of:

(a) storing selected queue ratios in the storage device of the queue selection apparatus;

(b) storing predetermined initial count data signals in the counter of the queue selection apparatus as the current count data signals;

(c) selecting one of the plurality of memory address queues as the current queue;

(d) selecting one of the access requests as the current request and selecting the associated memory address as the current memory address;

(e) associating said current request with a corresponding one of the plurality of memory address queues based on the identity of the device making the access request;

(f) storing said current memory address in said corresponding one of the plurality of memory address queues;

(g) modifying the current count data signals in the storage device of the queue selection apparatus;

(h) comparing the current count data signals to each of the queue ratios;

(i) selecting the associated one of the memory address queues as the current queue if a predetermined relationship existed between the current count data signals and the associated one of the predetermined queue ratios during said comparing step;

(j) selecting one of the addresses from the current queue to be provided to the memory based on a predetermined selection algorithm;

(k) storing said predetermined initial count data signals in the storage device of the queue selection means as the current count value and re-selecting one of the plurality of memory address queues as the current queue if a predetermined relationship existed between the current count data signals and the associated one of the predetermined queue ratios during said comparing step; and (l) repeating steps (d) through (k) as long as at least one of the access requests has not yet been selected as said current request.

25. The method as defined by claim 24, wherein said step (e) comprises the steps of determining whether said current memory address is equivalent to any of the memory addresses stored in any of the plurality of memory address queues; and storing said current memory address in the memory address queue which contains a memory address found to be equivalent to said current memory address in said determining step.

* * * * *